United States Patent [19]

Mastropaolo

[11] 4,254,573
[45] Mar. 10, 1981

[54] TROLLING DEVICE

[76] Inventor: Steven Mastropaolo, c/o Cacioppo, 242 Loop Dr., Sayville, N.Y. 11782

[21] Appl. No.: 33,308

[22] Filed: Apr. 25, 1979

[51] Int. Cl.³ .............................................. A01K 97/00
[52] U.S. Cl. .................................................. 43/43.13
[58] Field of Search .................. 43/43.13, 43.14, 42.31

[56] References Cited

U.S. PATENT DOCUMENTS

| | | | |
|---|---|---|---|
| 2,613,471 | 10/1952 | Traycik | 43/42.31 |
| 2,789,386 | 4/1957 | Creelman | 43/43.13 |
| 3,238,660 | 3/1966 | Pcola | 43/43.13 |
| 3,470,649 | 10/1969 | Cole | 43/43.13 |
| 3,908,300 | 9/1975 | Kuismi | 43/43.13 |
| 4,028,839 | 6/1977 | Stubblefield | 43/43.13 |
| 4,161,841 | 7/1979 | Holstein | 43/43.13 |

*Primary Examiner*—Nicholas P. Godici
*Attorney, Agent, or Firm*—John Maier, III

[57] ABSTRACT

A trolling device in the form of a buoyant underwater plane with forward and rearward swept back wings on an elongated body. Heavy spheres loosely located in compartments within the elongated body start underwater oscillation.

10 Claims, 4 Drawing Figures

TROLLING DEVICE

BACKGROUND OF THE INVENTION

It is well known that fish are prone to strike at a line which is moving up and down in the water. It is also known to fish with multiple lines and to place these lines on a craft which oscillates underwater towed by a boat. Craft have been previously developed which oscillate under the water. The oscillation, however, is often achieved by means of complicated mechanical mechansims which rotate the wings of the craft to cause the oscillations.

This invention relates in general to improvements for a trolling device and particularly to a trolling device which oscillates underwater. Prior art showing trolling devices and other fishing and under water equipment are as follows:

| Squarebriggs | 1,320,804 |
|---|---|
| Creelman | 2,789,386 |
| Cole | 3,470,649 |
| Pulsifier | Re. 25,165 |
| Daves | Des. 174,492 |

SUMMARY OF THE INVENTION

The present invention provides an improved trolling device for underwater fishing which in a simple and inexpensive manner provides an oscillating underwater craft which dives and which can be adjusted so as to be trolled to one side of the tow boat. The trolling device is not only simple and comparatively inexpensive to construct but is durable and capable of a long life of efficient operation.

The novel features which are considered as characteristic of the invention are set forth with particularity in the appended claims. The trolling device, which is buoyant when not being towed, includes an elongated body with a pair of swept-back wings mounted on it. The swept-back wing located to the rear section of the craft is raised slightly above the forward swept-back wing to increase the stability of the craft. The rearward wing is also pivotable to permit the trolling device to be towed to either side of the tow boat out of the wake of the tow boat. A pair of parallel rudders extend downwardly from the outside edges of the rearward wing. The forward edge of both wings has a thirty degree angle as does the rear edge of the rearward wing. The rearward edge of the forward wing has approximately a sixty degree angle. The aspect ratio of the forward wing is within the range of one to two. A multiplicity of heavy spheres, such as lead balls, are located in two compartments in the rearward portion of the elongated body. Each of the compartments is large enough so that the spheres can roll back and forth at least a short distance.

The invention itself, however, as to its construction and obvious advantages will be best understood from the following description of the specific embodiment when read with the accompanying drawings.

DETAILED DESCRIPTION OF THE PREFERRED EMBODIMENTS OF THE INVENTION

Although the description hereof is detailed and exact to enable those skilled in the art to practice the invention, the physical embodiments herein disclosed merely exemplify the invention which may be embodied in other specific structures. The scope of the invention is defined in the claims appended hereto.

Figure 1:
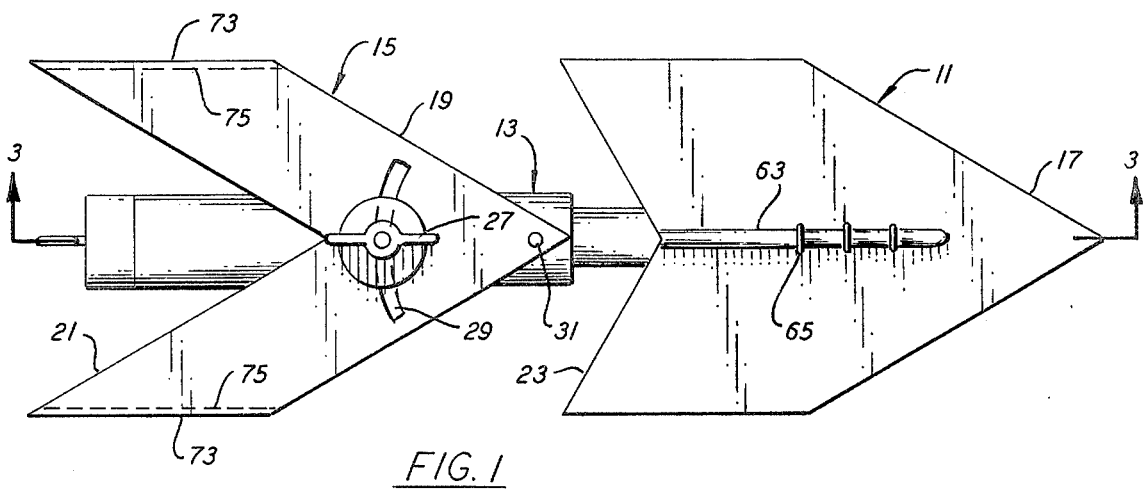
FIG. 1 is a plan view of the device.

Referring now to FIG. 1, a forward wing 11 is mounted on an elongated body 13. Behind the forward wing 11, also mounted on the elongated body 13, is a rearward wing 15. The forward edge 17 of the forward wing 11 is swept back approximately thirty degrees. Similarly, the forward edge 19 and rearward edge 21 of the rearward wing 15 are swept back approximately thirty degrees. The rearward edge 23 of the forward wing 11, however, is swept back approximately sixty degrees.

One feature of this trolling device is the aspect ratio of the forward wing 11 and the rearward wing 15. Aspect ratio is the wing span squared divided by the area of the wing. Usually, particularly with airborne craft, the aspect ratio of a wing is anywhere between six and twenty. The forward wing 11 and the rearward wing 15, according to this invention have an aspect ratio substantially smaller, being within the range of one and two. Such a wing is inherently unstable in air since the center of pressure would move much more than the standard design factor of six to eight percent of the mean cord within the mean length of the wing. According to this invention, the center of pressure moves substantially along the longitudinal axes with a maximum change in the angle of attack. The angle of incidence according to this invention is zero. The angle of incidence is the angle between the wings 11, 15 and a horizontal plane along the longitudinal axes of the elongated body 13.

Figure 2:
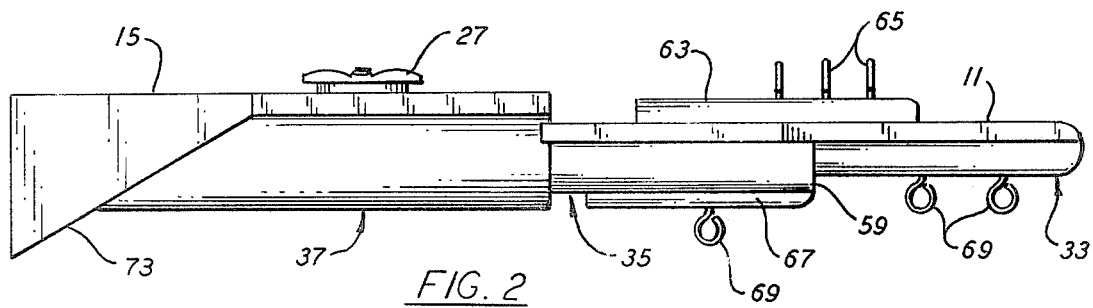
FIG. 2 is a side view of the device.
Figure 3:
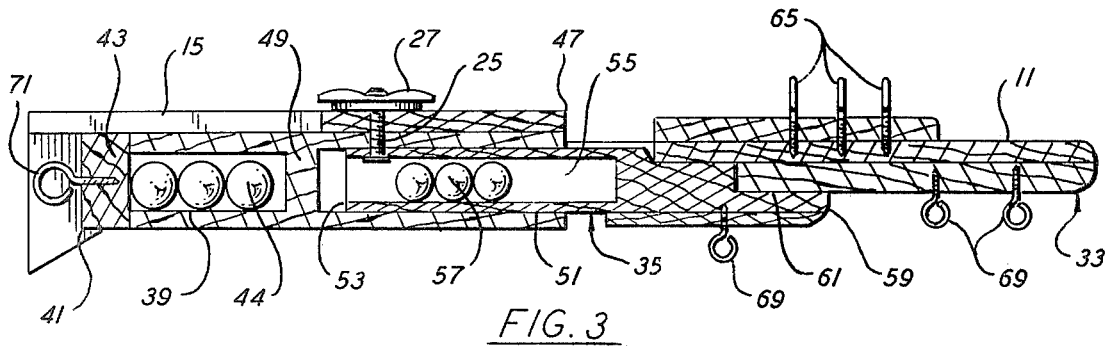
FIG. 3 is a cross-sectional view along line 3—3 of FIG. 1.
Figure 4:
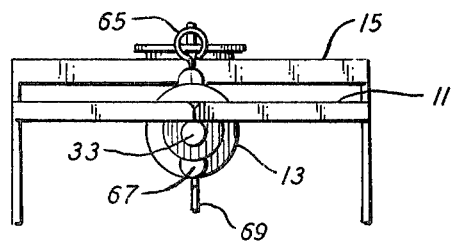
FIG. 4 is a front view of the device.

As best seen in FIGS. 2, 3 and 4, the rearward wing 15 is elevated just slightly above the forward wing 11 to increase the stability of the trolling device and prevent it from turning upside down when being towed. The rearward wing 15 is rotatably mounted on the elongated body 13. A bolt 25 is connected to the elongated body 13 and a thumb nut 27 is threaded on the bolt 25. A curved slot 29 is located in the rearward wing 15 and when the thumb nut 27 is loosened, the rearward wing 15 may be pivoted in either direction about a pivot pin 31 also secured into the elongated body 13. By pivoting the rearward wing 15, the trolling device, when towed, will move to one side of the towing boat thereby removing the trolling device from the wake of the towing boat.

The elongated body 13 includes a forward body section 33, intermediate body section 35 and a rearward body section 37. As best seen in FIG. 3, a rearward compartment 39 is drilled from the rearward end 41 of the elongated body 13 and the rearward body section 37 along the longitudinal axes of the elongated body 13 thereby forming the rearward compartment 39. An end member 43 is then secured to the rearward end 41 of the rearward body section 37 closing the rearward compartment 39. Within the rearward compartment 39, are located three rear spheres 44 made from a high density material, as for example, lead. The forward end 47 of the rearward body section 37 is also drilled out along the longitudinal axes of the elongated body 13 to form an opening 51. A partition 49 is left between the rearward compartment 39 and the opening 51 which serves to receive the rearward end 53 of the intermediate body section 35. The intermediate body section 35 is also drilled from its rearward end 53 along its longitudinal axes forming a forward compartment 55. The intermediate body section 35 is fitted into the opening 51 in the rearward body section 37. The forward compartment 55 is sealed by the insertion of the intermediate body section 35 into the opening 51. The forward compartment 55 has a slightly smaller diameter than the rearward compartment 39. Again, three spheres 57, also made from a high density material, preferable lead, are loosed located within the forward compartment 55. It should be noted that the forward compartment 55 is longer than the rearward compartment 39 thereby providing a greater space in which the spheres 57 may roll back and forth.

The rearward spheres 44 and the forward spheres 57 serve to start the oscillations of the trolling device. The trolling device either rises or dives due to the pull of the tow boat and immediately on changing position, the spheres 44, 57 force the initiated trend to continue until again forced to change by the pull of the tow boat. It should be noted that the troling device is buoyant, being preferably made from balsam wood. When not under tow, the trolling device, because of its buoyancy, will rise to the surface and will not sink and oscillate until towed.

At the forward end 59 of the intermediate body section 35 another opening 61 is drilled along the longitudinal axes of the intermediate body section 35. The forward body section 33, which has a circular cross section, is fitted into the opening 61 and thus secured to the intermediate body section 35.

As best seen in FIGS. 2 and 3, the forward wing 11 is located substantially over the forward body section 33 and a portion of the intermediate body section 35. The rearward wing 15 is located over the rearward body section 37 and the intermediate body section 35. A top ridge 63 is located on the top of the forward wing 11 and serves as a support for three tow line eyelets 65. A tow rope (not shown) is connected to these eyelets 65. By connecting the tow rope to an eyelet 65 located closer to the rearward end 41, the depth of the dive is greater. This is because the center of pressure moves forward as the attach point, namely an eyelet 65, moves toward the rearward end 41 thus changing the angle of attack. Similarly, a lower ridge 67 is connected to the base of the intermediate body section 35 toward the forward body section 33 and serves to hold a series of lure line eyelets 69. To these eyelets 69, fishing lines (not shown) are connected which drag along underneath the trolling device. An eyelet 71 is also connected to the rear to hold a lure line.

A pair of rudders 73 having a triangular shape extend downwardly at right angles from the outside ends 75 of the rearward wing 15. The rudders 73 control the direction of the trolling device and causes the sideward position when the rearward wing 15 is pivoted.

The invention may be embodied in other specific forms without departing from the spirit or essential characteristics thereof. The present embodiments are, therefore, to be considered in all aspects as illustrative and not restrictive. The scope of the invention is indicated by the appended claims rather than the foregoing description and all changes which come within the meaning of range and equivalency of the claims are, therefore, intended to be embraced therein.

I claim:

1. A trolling device for oscillating a fishing lure when towed in the water, said trolling device comprising:
   an elongated body having a forward end and a rearward end and with a pair of compartments located longitudinally within the elongated body, one of said pair of compartments being located adjacent the rearward end of the elongated body and the other of said pair of compartments being located adjacent and forward of the first-mentioned comparment;
   a swept-back forward wing mounted on the forward end of the elongated body and having an aspect ratio of between one and two;
   a swept-back rearward wing mounted on the elongated body at the rearward end;
   spheres rollably located within each of said pair of compartments; and
   means on said elongated body for connection thereto to a trolling line.

2. A trolling device according to claim 1 wherein said swept-back rearward wing is pivotable.

3. A trolling device according to claim 1 wherein said swept-back rearward wing and said swept-back forward wing are parallel to one another and said swept-back rearward wing is removed slightly further from said elongated body then said swept-back forward wing.

4. A trolling device according to claim 1, further including a pair of rudders protruding substantially at right angles from said swept-back rearward wing.

5. A trolling device according to claim 1 wherein the swept back forward wing has a forward edge and a rearward edge and is swept-back at the forward edge approximately thirty degrees from the centerline of the elongated body and the rearward edge is swept-back approximately sixty degrees from the centerline of the elongated body.

6. A trolling device according to claim 1 wherein the swept-back rearward wing has a forward edge and a rearward edge and both the forward edge and the rearward edge are swept-back approximately thirty degrees from the centerline of the elongated body.

7. A trolling device according to claim 1 wherein said swept-back rearward wing includes a pair of substantially parallel outside edges and further includes a pair of parallel rudders extending from said pair of parallel outside edges adjacent said elongated body.

8. A trolling device according to claim 7 wherein said pair of parallel rudders have a triangular shape.

9. A trolling device according to claim 5 wherein said swept-back rearward wing is pivotable.

10. A trolling device according to claim 1 wherein said swept-back rearward wing has an aspect ratio within the range of one and two.

* * * * *